United States Patent [19]
Richardson

[11] 3,729,898
[45] May 1, 1973

[54] REMOVAL OF ENTRAINED MATTER FROM GAS STREAMS

[75] Inventor: Harry L. Richardson, New York, N.Y.

[73] Assignee: Chemical Construction, New York, N.Y.

[22] Filed: June 1, 1971

[21] Appl. No.: 148,452

[52] U.S. Cl. .............................. 55/7, 55/10, 55/73, 55/107, 55/122, 55/124, 55/138, 55/139, 55/151, 55/238, 55/257, 261/116, 261/DIG. 54

[51] Int. Cl. .............................................. B03c 3/16

[58] Field of Search ........................ 55/4, 5, 106, 107, 55/120, 122, 136, 137, 138, 139, 10, 151, DIG. 3, 8, 6, 7, 238, 257, 459, 73, 124; 261/DIG. 54, 116, 115

[56] References Cited

UNITED STATES PATENTS

| | | | |
|---|---|---|---|
| 2,004,352 | 6/1935 | Simon | 310/5 |
| 2,207,576 | 7/1940 | Brown | 55/107 |
| 2,935,375 | 5/1960 | Boucher | 23/2 |
| 3,237,382 | 3/1966 | Berly | 55/139 X |
| 3,520,172 | 7/1970 | Liu et al. | 55/151 X |
| 3,624,448 | 11/1971 | Saurenman et al. | 317/4 |
| 3,638,925 | 2/1972 | Braemer | 261/DIG. 54 |

FOREIGN PATENTS OR APPLICATIONS

| | | | |
|---|---|---|---|
| 1,166,236 | 6/1958 | France | 55/127 |
| 421,811 | 12/1934 | Great Britain | 55/107 |
| 686,777 | 1/1953 | Great Britain | 55/346 |

Primary Examiner—Dennis E. Talbert, Jr.
Attorney—J. L. Chaboty

[57] ABSTRACT

Particulate material such as a fume, fog or mist, is removed from a gas stream by passing the gas stream laden with entrained solid or liquid particulate material through a venturi scrubber, and dispersing scrubbing liquid droplets into the venturi scrubber passage. The scrubbing liquid droplets are provided with a high voltage electrostatic charge, so that the liquid droplets attract and entrain the particulate material, which is preferably also provided with an electrostatic charge of opposite polarity to the charge on the liquid droplets. Improved gas scrubbing efficiency is attained, especially when removal of submicron or colloidal particles is required, in order to recover the particulate material and/or prevent air pollution.

13 Claims, 2 Drawing Figures

Patented May 1, 1973

HARRY L. RICHARDSON
INVENTOR.

BY J. T. Chality
AGENT

HARRY L. RICHARDSON
INVENTOR.

REMOVAL OF ENTRAINED MATTER FROM GAS STREAMS

BACKGROUND OF THE INVENTION

1. Field of the Invention

The invention relates to the removal of entrained particulate material from gas streams, in order to prevent air pollution when the gas stream is a waste or tail gas which is subsequently discharged to the atmosphere, or to recover valuable amounts or proportions of entrained material from the gas stream. The invention is especially applicable to the removal of sub-micron or colloidal particulate material from gas streams, such as solid or liquid fume, fog or mist, which may be generated in numerous types of industrial facilities, such as chemical plants, metallurgical facilities such as smelters, electric furnaces, basic oxygen steel furnaces, or the like.

2. Description of the Prior Art

Numerous types of venturi gas scrubbers or scrubbers having a venturi-like configuration as well as orifices, impingers, etc., have been suggested in the prior art, for usage in scrubbing an impurity-laden gas stream with a scrubbing liquid. In venturi scrubbers, the gas stream is accelerated to a high velocity in a passage of venturi configuration, preferably in accordance with the Bournetti theorem, and a scrubbing liquid is injected or projected into the gas stream at the throat of the venturi, which is the region of maximum gas velocity. Typical venturi type scrubbers are shown in British Patent No. 911,271 and U.S. Pat. Nos. 3,567,194 and 2,604,185. Parallel venturi passage scrubbers are shown in Canadian Patents Nos. 788,802 and 751,209, and U.S. Pat. Nos. 3,440,803; 3,347,024; 3,339,344; 3,181,287 and 2,797,904. Annular venturi passage scrubbers are shown in British Patent No. 1,100,295; Canadian Patent No. 749,764; U.S. Pat. Nos. 3,584,440; 3,544,086; 3,317,197; 3,191,364; 3,085,793, 2,869,674; 2,621,754; allowed U.S. Patent application Ser. No. 843,444 filed July 22, 1969 now U.S. Pat. No. 3,638,925 and U.S. Patent application Ser. No. 20,579 filed Mar. 18, 1970 now U.S. Pat. No. 3,690,044.

Numerous types of electrostatic precipitators for the removal of entrained particulate material from gas streams have been suggested in the prior art, and these devices have been widely utilized in practice to remove dust, fly ash, soot and other troublesome entrained material such as fume, fog, and mist from gas streams. In operation, electrostatic precipitators generate a field of unidirectional high electrical voltage, usually negative, through which the gas stream is passed. The entrained solid or liquid particles are charged by the emitting electrodes and driven by the force of the field to the grounded collecting surfaces. Usually, periodic or intermittent rapping of the plates, pipes or other designs of surface, causes separated solid material to fall to the bottom of the device, from where it is removed for disposal. Separated liquid material such as fog or mist particles will automatically drain to and collect in the bottom of the unit. In any case, the gas is cleaned by means of electrostatic removal of entrained material, and air pollution is prevented. Among the numerous arrangements of electrical or electrostatic precipitators are types in which the electrically charged wires are followed by wire mesh or fiber mass filters or the like. Other types provide grids, wire mesh or rods downstream of the charged wires. Typical patents showing various configurations include British Patents Nos. 962,773 and 444,333; U.S. Pat. Nos. 3,049,848, 2,990,912; 2,989,146; 2,973,054; 2,847,082; 2,822,058; 2,764,254; 2,715,944; 2,672,947; 2,593,377; 2,582,133 and 2,556,982 and U.S. Patent application Ser. No. 4,947 filed Jan. 22, 1970 now U.S. Pat. No. 3,668,836.

The use of electrostatically sprayed water as a spray which is atomized both mechanically and electrostatically, to scrub a gas stream, was studied and reported in the Proceedings (Part I) of the International Clean Air Congress, London, 1966, Paper V/5, pages 129–130.

SUMMARY OF THE INVENTION

In the present invention, a modification is provided in venturi-type scrubbers which greatly increases scrubbing efficiency and particulate removal. A high voltage electrostatic charge is provided on the scrubbing liquid being passed to the venturi scrubber, so that when the liquid is sprayed into the venturi passage for particulates removal, the discrete scrubbing liquid droplets are provided with a high voltage electrostatic charge. In addition, in a preferred embodiment, the entrained particulate material in the gas stream is provided with a charge of opposite polarity upstream of the venturi scrubber. In any case, the particulate material is attracted to and entrained in the charged liquid droplets within the venturi passage, and scrubbing efficiency is greatly enhanced. Thus, a lower gas pressure drop may be provided in the venturi scrubber, which may be a conventional single venturi, annular venturi, parallel passage venturi, or any liquid contactor. In addition, a lesser flow of scrubbing liquid is required to attain high scrubbing efficiency, and the apparatus is relatively simple and easy to fabricate and erect or construct, and operates with low electric current consumption.

It is an object of the present invention to provide an improved method for scrubbing gas streams to remove entrained particulate material.

Another object is to provide an improved method for scrubbing gas streams to remove entrained material which is difficult to remove by known prior art methods, such as sub-micron or colloidal dust, fly ash, soot, mist, fog or fume, many of which are in the range of molecular size and are outside the scope of conventional collection equipment.

An additional object is to prevent air pollution by effectively removing entrained particulate material from waste gases, prior to the discharge of the waste gas to the atmosphere.

A further object is to enhance the gas scrubbing efficiency of a venturi scrubber.

Still another object is to combine the forces of electrostatic precipitation with a venturi gas scrubber, by providing a spray of electrostatically charged liquid droplets as the scrubbing medium in a venturi scrubber.

These and other objects and advantages of the present invention will become evident from the description which follows.

DESCRIPTION OF THE DRAWINGS AND PREFERRED EMBODIMENTS

Referring now to the drawings.

Figure 1:
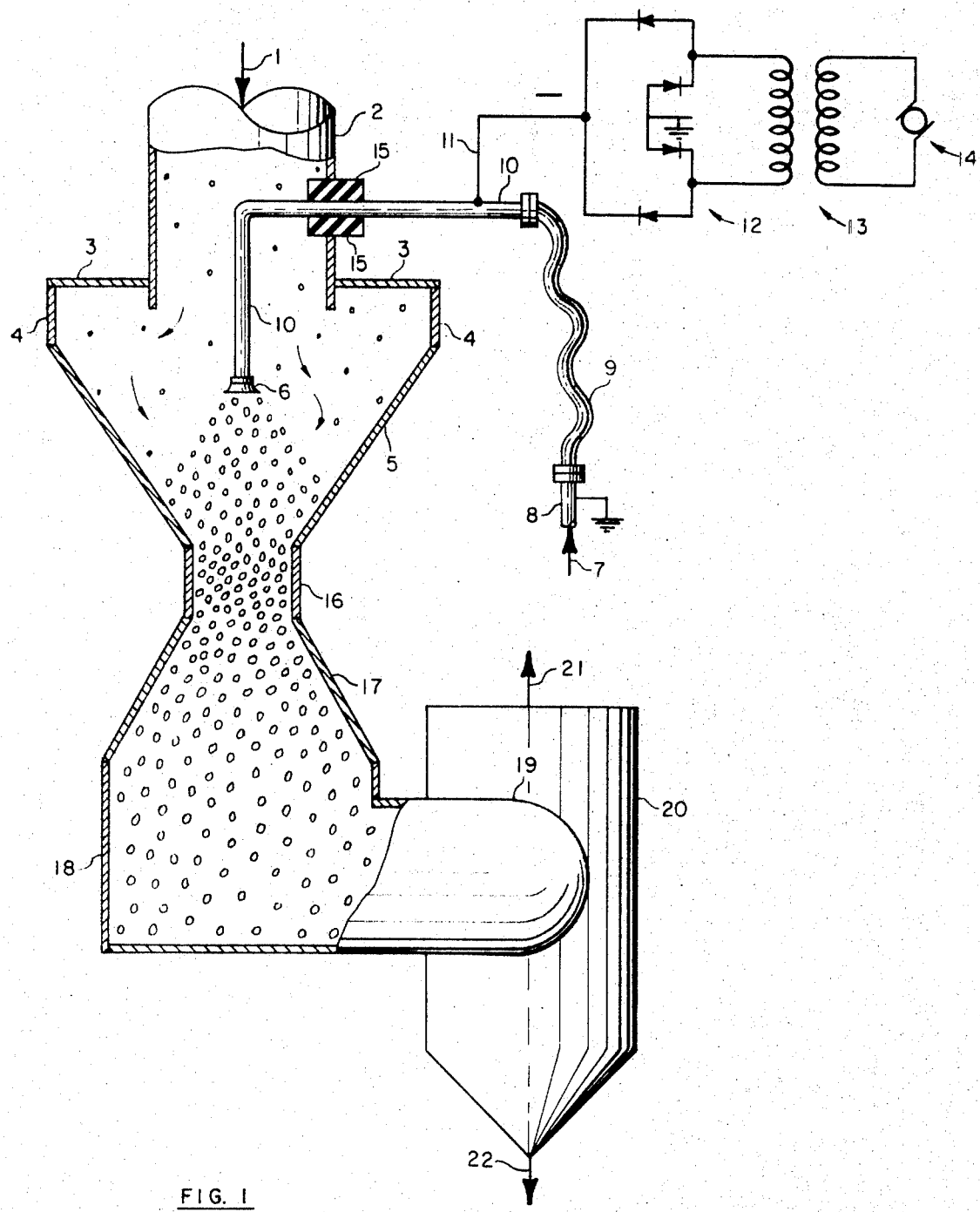
FIG. 1 is a diagram and flowsheet of one embodiment of the invention.

Referring now to FIG. 1, a gas stream 1 is a gaseous or vaporous stream derived from any source or facility which generates a gaseous stream containing entrained particulate material. Thus, stream 1 may be a process gas stream in a chemical process or derived from a metallurgical facility, or a waste stack, flue or tail gas generated by a chemical or metallurgical plant, incinerator, steam power boiler or the like. Stream 1 may also be a vaporous stream containing entrained solids or a mist or fog of liquid particles. Thus, the entrained particulate material in stream 1 may be liquid droplets or of solid composition, and may be in the form of a mist, fog or fume or the like, and in many instances at least a portion of the particulate material in stream 1 will be sub-micron or colloidal in nature. Other types of entrained particulate material which may be present in stream 1 include soot, fly ash and dust. In this embodiment of the invention, stream 1 is a gas stream generated by an electric furnace and containing an entrained fume of sub-micron solid particles.

Stream 1 is preferably passed downwards through the vertically oriented cylindrical conduit 2, which terminates at or below the circular baffle 3. The gas stream is discharged from conduit 2 through a central opening in horizontal baffle 3, which is provided with a dependent cylindrical baffle 4 which depends downwards from the outer perimeter of baffle 3. The baffles 3 and 4 define the upper end of a vertically oriented venturi passage having an approach section defined by the inverted frusto-conical baffle 5, which depends from baffle 4. Where desirable, any orientation may be utilized.

A spray nozzle 6 is centrally mounted within baffle 5, and sprays discrete droplets of electrostatically charged scrubbing liquid downwards into the gas stream which is accelerated to high velocity due to flow downwards through the converging passage defined by baffle 5. The scrubbing liquid is derived as stream 7, which may be any suitable liquid or solution which is of low electrical conductivity, or which is essentially a nonconductor of electricity, such as water. In this embodiment of the invention, stream 7 consists of water which is passed through grounded inlet pipe 8 and then through a suitable length of piping 9 composed of nonconductive material, such as polyvinyl chloride tubing. A sufficient length of piping or tubing 9 is chosen so that an insulating column of water is maintained within tubing 9, and current leakage to grounded pipe 8 is negligible.

The water flows from tubing 9 into inlet pipe 10, which is provided with a high voltage electrostatic charge, either positive or negative, by means of wire 11, which in this case extends to a source of high voltage negative potential electric current consisting in this case of solid state rectifier bridge 12, which provides a negative potential generally above 40 KV and typically in the range of 40 to 100 KV, or higher. The bridge 12 provides a series of half-waves of potential, however in other suitable instances pulse energization or other wave forms may be provided in practice. A voltage potential consisting of high voltage alternating current is provided across bridge 12 by high voltage transformer 13, which is connected to a conventional source of alternating current such as electrical generator 14.

The flow of high voltage direct current of negative potential through wire 11 and into pipe 10 serves to impress a negative charge on the water stream flowing within pipe 10, and loss of potential to ground is essentially completely prevented by the provision of insulating tubing 9, which is typically at least 20 meters in length to assure minimum electrical leakage to ground. The pipe 10 extends through insulating fitting 15 and terminates at spray nozzle 6 within the venturi passage, so that the electrically charged water is passed from pipe 10 into nozzle 6 for dispersion into the gas stream as discrete droplets of scrubbing liquid provided with a high voltage electrostatic charge.

The charged liquid droplets rapidly and essentially completely entrain the particulate material from the gas stream as the mixture of gas stream and liquid droplets flows downwards into the throat section of the venturi passage defined by vertically oriented cylindrical baffle 16 which depends from baffle 5. The resulting mixture of cleansed gas and liquid droplets containing particulate matter removed from the gas stream now flows downwards from throat section 16 into the diverging section of the venturi passage defined by frusto-conical baffle 17 which depends from baffle 16 and which is provided to prevent turbulence and assure minimum gas pressure drop through the device.

In the orientation shown, the gas-liquid droplets mixture flows downwards from baffle 17 into transition conduit 18 which directs the mixture into horizontal conduit 19 which is tangential to gas-liquid separator 20, which is a cyclonic or baffled unit of conventional design for separating the mixture into a scrubbed gaseous phase and a liquid phase containing separated particulate material. The separated scrubbed gaseous or vaporous phase is removed from unit 20 via stream 21, and in instances when stream 1 is a waste or tail gas, or a combustion effluent gas from the burning of a fuel, stream 21 may be passed to a stack for atmospheric discharge or other disposal. The liquid phase is removed from unit 20 via stream 22, and in instances when the particulate material originally present in stream 1 includes solid particles, stream 22 may be filtered or otherwise clarified to remove entrained solids prior to recycle of a clear liquid phase via stream 7.

Figure 2:
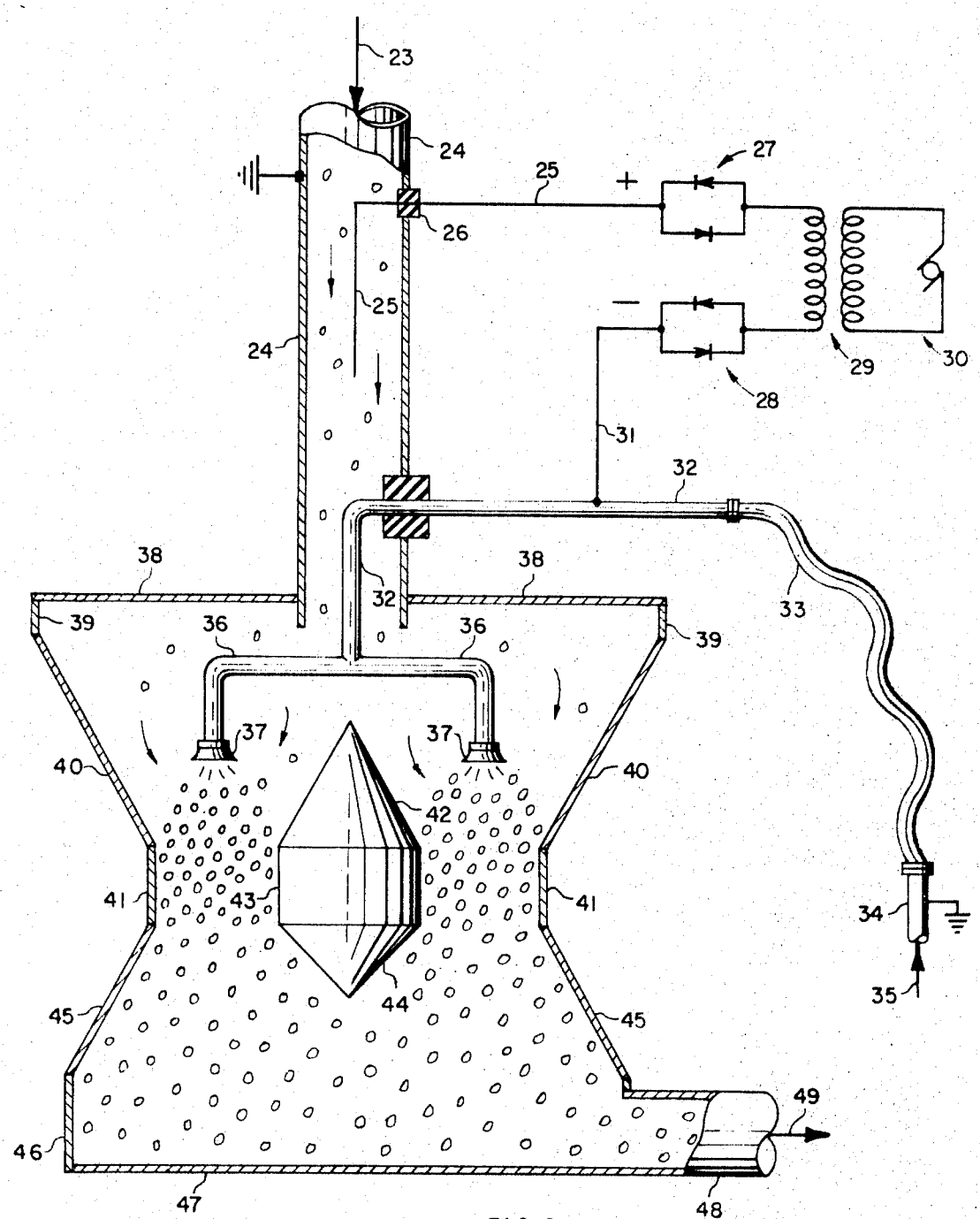
FIG. 2 illustrates an alternative embodiment of the invention.

Referring now to FIG. 2, an alternative embodiment of the invention is illustrated, in which an annular venturi configuration is provided for gas-liquid contact, and in which the entrained particulate material in the gas stream is also provided with an electrostatic charge prior to gas-liquid contact. Gas stream 23 contains entrained particulate material, either solid or liquid in nature, in the form of a fog, fume, mist, soot, fly ash, dust, or the like, and stream 23 is typically derived from one of the sources mentioned supra. Stream 23 flows downwards through the grounded conduit 24, and passes between the centrally suspended high voltage wire 25 and the grounded wall of conduit 24. A high voltage charge of positive polarity is impressed on wire 25, so that a corona discharge extends through the gas stream between wire 25 and conduit 24, and a positive charge is impressed or deposited on the entrained particles in the gas stream within conduit 24.

The wire 25 extends through the wall of conduit 24 via insulating fitting 26, and wire 25 extends from one side or pole 27 of a solid state rectifier bridge. The circuit 27 transmits unidirectional positive potential via a series of spaced waves or pulses. The other side 28 of the rectifier bridge transmits negative potential via spaced wave pulses. The circuits 27 and 28 are connected to the high voltage side of an alternating current transformer 29, which in turn is connected to an electrical generator 30 which develops alternating electric current, typically at 220 volts and 60 cycles.

Returning to rectifier bridge section 28, the high voltage negative potential generated by circuit section 28 is transmitted via wire 31 to metallic pipe 32, which is thus provided with a high voltage negative electrostatic charge. A scrubbing liquid such as water is passed via tubing 33 into pipe 32. The tubing 33 is typically composed of an insulating material of construction, such as polyvinyl chloride, polyethylene, glass, rubber, or any material of a high dielectric strength. Tubing 33 receives a stream of water or the like non-conducting scrubbing liquid via grounded pipe 34, which transmits water stream 35 to tubing 33 for transfer into pipe 32. Tubing 33 is of a sufficient length, typically 20 meters or longer, to provide a sufficient insulated water head or column which prevents voltage leakage to grounded pipe 34.

Pipe 32 extends into conduit 24 via an insulated mounted similar to mounting 26, and the outlet of pipe 32 terminates at radial feeder pipes 36 which transmit the charged water to spray nozzles 37. The nozzles 37 are disposed above the throat of the annular venturi passage defined by upper circular horizontal baffle 38, vertical cylindrical baffle 39, inverted frusto-conical baffle 40, vertical cylindrical outer throat section baffle 41, central conical baffle 42 and vertical cylindrical inner throat section baffle 43.

The spray of charged water droplets discharged from nozzles 37 flows into the annular venturi approach section defined by the convergence of the baffles 40 and 42, and into the annular venturi throat section defined between the vertical cylindrical baffles 41 and 43. Due to the positive electrostatic charge on the entrained particulate material in the gas stream, this particulate material is strongly attracted to and entrained in the negatively charged discrete liquid water droplets within the throat section of the annular venturi passage, and equilibrium is rapidly reached in the throat section due to high gas velocity, with thorough gas scrubbing and removal of particulate material from the gas stream into the liquid droplets. In addition, gaseous impurity such as sulfur dioxide originally present in the gas stream may be at least partially dissolved into the scrubbing liquid in some instances, such as when stream 35 is slightly alkaline in nature.

The equilibrium gas-liquid mixture formed in the annular throat section of the venturi now flows downwards into a divergent passage formed between inverted conical baffle 44, which depends from baffle 43, and the frusto-conical baffle 45 which depends from baffle 41. The gas-liquid mixture is diverted by lower cylindrical baffle 46 and bottom disc-shaped baffle 47 into conduit 48, and flows via stream 49 to a suitable gas-liquid separation means such as unit 20 described supra.

Numerous alternatives within the scope of the present invention, besides those alternatives and variations mentioned supra, will occur to those skilled in the art. The invention is generally applicable to any type of venturi configuration such as the venturi scrubbers described in the patents cited supra. The invention may utilize any suitable source of high voltage electrostatic potential, such as pulse energization, a direct current source of constant high voltage potential, or the like. The pipe 10 may alternatively extend through baffles 3 or 4, and spray nozzle 6 may be alternatively disposed within the lower end of conduit 2, or within baffle 4, or even within the venturi throat section defined by baffle 16. Similar considerations apply to the pipe 32 and spray nozzles 37 of FIG. 2. In addition, more than two spray nozzles may be provided in suitable instances, either with respect to FIG. 1 or FIG. 2. Baffles 17, 44 and 45 may be omitted in some cases, however this alternative is relatively less desirable because direct discharge from a venturi throat into a larger chamber leads to increased turbulence and gas pressure drop. A pool or layer of scrubbing liquid may deposit on the upper surface of the horizontal baffle below baffle 18 or on baffle 47, and this deposited scrubbing liquid may be separately removed for disposal. In some cases, stream 22 will be discarded and fresh scrubbing liquid such as water will be passed into the system via streams 7 or 35. Additional uncharged scrubbing liquid may be passed downwards on the inner surface of baffles 5 or 40, or on the outer surface of baffle 42, for projection into the gas stream within the venturi throat.

An example of application of the present invention to an industrial facility will now be described.

EXAMPLE

Operation of a 1,500 ACFM pilot unit treating the gases drawn from a typical electric furnace for the production of ferrosilicon has been tested. The average particle size of the suspensoid was about 0.086 microns, with power input as per FIG. 1 of less than 0.5 milliamperes at 100 KV. Indicated efficiencies are over 90 percent collection at one-tenth of the power required for operation of a conventional venturi scrubber.

I claim:

1. A method for removing particulate material and sulfur dioxide from a gas stream containing entrained particulate material and sulfur dioxide which comprises providing a high voltage electrostatic charge on particulate material in a gas stream containing entrained particulate material and sulfur dioxide, accelerating said gas stream containing charged entrained particulate material and sulfur dioxide to high velocity by passing said gas stream through an inlet conduit extending to a venturi passage, said venturi passage being defined by a converging inlet section, a restricted throat section and a diverging outlet section, spraying discrete droplets of a slightly alkaline scrubbing liquid into said gas stream prior to the discharge of said gas stream from the throat section of said venturi passage, said discrete liquid droplets being provided with a high voltage electrostatic charge of opposite polarity to the charge on said particulate material, whereby said particulate material is attracted to and entrained in said discrete liquid droplets within said venturi passage and sulfur dioxide is dissolved into said discrete liquid droplets, and separating the gas-liquid mixture discharged from said venturi passage into scrubbing liquid containing particulate material and dissolved sulfur dioxide, and a gas stream of depleted sulfur dioxide and particulate material content.

2. The method of claim 1, in which said particulate material consists of a fume of discrete solid particles.

3. The method of claim 1, in which said particulate material consists of a mist of discrete liquid droplets.

4. The method of claim 1, in which said venturi passage is vertically oriented and said gas stream is passed downwards through said vertically oriented venturi passage.

5. The method of claim 1, in which said discrete droplets of scrubbing liquid are sprayed into said gas stream within the converging inlet section of said venturi passage.

6. The method of claim 1, in which said scrubbing liquid is an aqueous alkaline solution.

7. The method of claim 1, in which said entrained particulate material is provided with a high voltage electrostatic charge by connecting said inlet conduit to a grounded electrical terminal, suspending at least one wire within said conduit, and impressing a high voltage potential on said wire, whereby a corona discharge extends through said gas stream between said wire and said conduit.

8. The method of claim 7, in which said wire is aligned along the central axis of said conduit.

9. The method of claim 1, in which said discrete liquid droplets are provided with a high voltage electrostatic charge by passing said scrubbing liquid through a pipe insulated from ground, said pipe being provided with a terminal liquid spraying means disposed within said venturi passage, and impressing a high voltage potential on said pipe, whereby the scrubbing liquid within said pipe is provided with a high voltage and discrete liquid droplets discharged from said liquid spraying means are electrostatically charged.

10. The method of claim 9, in which said pipe is insulated from ground by suspending said pipe from at least one insulator, and passing said scrubbing liquid into said pipe through liquid transfer means composed of an electrically insulating material.

11. The method of claim 10, in which said electrically insulating material is polyvinyl chloride.

12. The method of claim 1, in which said high voltage electrostatic charges are derived from a solid state rectifier bridge connected to the secondary coil of a transformer.

13. The method of claim 1, in which said venturi passage is an annular venturi passage.

* * * * *